United States Patent [19]
Yang

[11] Patent Number: 5,857,435
[45] Date of Patent: Jan. 12, 1999

[54] TWO CYCLE ENGINE

[76] Inventor: David S. W. Yang, 10003 Autumnview La., Ellicott City, Md. 21043

[21] Appl. No.: 923,894

[22] Filed: Sep. 4, 1997

[51] Int. Cl.$^6$ ............................. F01L 3/06; F02B 15/00
[52] U.S. Cl. .......................... 123/65 VB; 123/90.11; 123/41.81; 123/306
[58] Field of Search ................... 123/73 C, 65 VB, 123/90.11, 669, 41.72, 41.81, 188.3, 306, 308

[56] References Cited

U.S. PATENT DOCUMENTS

| | | | |
|---|---|---|---|
| 1,291,837 | 1/1919 | Gorham | 123/41.81 |
| 1,341,227 | 5/1920 | Diamond | 123/41.81 |
| 1,416,170 | 5/1922 | Cattaneo | 123/41.81 |
| 1,926,684 | 9/1933 | Miller | 123/41.81 |
| 2,030,732 | 2/1936 | Angel | 123/65 VB |
| 2,102,662 | 12/1937 | Wurtele | 123/41.81 |
| 2,215,911 | 9/1940 | Peterson | 123/65 VB |
| 2,659,351 | 11/1953 | Chronic et al. | 123/65 VB |
| 2,731,004 | 1/1956 | Hopkins | 123/65 VB |
| 2,785,667 | 3/1957 | Miller | 123/65 VB |
| 2,998,808 | 9/1961 | Jackson | 123/41.81 |
| 3,042,012 | 7/1962 | Buchi | 123/65 VB |
| 4,108,118 | 8/1978 | George | 123/41.81 |
| 4,445,467 | 5/1984 | Westerman et al. . | |
| 4,744,340 | 5/1988 | Kirby | 123/306 |
| 4,794,890 | 1/1989 | Richeson, Jr. . | |
| 4,922,865 | 5/1990 | Kumagai et al. | 123/73 C |
| 4,972,810 | 11/1990 | Kawamura | 123/90.11 |
| 4,995,347 | 2/1991 | Tate et al. . | |
| 4,995,350 | 2/1991 | Kumagai et al. . | |
| 4,995,354 | 2/1991 | Morikawa . | |
| 5,009,202 | 4/1991 | Kawamura . | |
| 5,095,856 | 3/1992 | Kawamura . | |
| 5,107,801 | 4/1992 | Huang . | |
| 5,111,779 | 5/1992 | Kawamura . | |
| 5,119,772 | 6/1992 | Kawamura | 123/90.11 |
| 5,131,354 | 7/1992 | Richeson . | |
| 5,133,309 | 7/1992 | Ishii . | |
| 5,154,141 | 10/1992 | McWhorter . | |
| 5,158,046 | 10/1992 | Rucker . | |
| 5,159,903 | 11/1992 | Takahashi . | |
| 5,163,388 | 11/1992 | Jonsson . | |
| 5,189,996 | 3/1993 | Richeson et al. . | |
| 5,190,006 | 3/1993 | Motoyama et al. . | |
| 5,191,858 | 3/1993 | McWhorter . | |
| 5,331,929 | 7/1994 | Plantan . | |
| 5,515,818 | 5/1996 | Born . | |

*Primary Examiner*—David A. Okonsky
*Attorney, Agent, or Firm*—Rosenberg, Klein & Bilker

[57] ABSTRACT

A two stroke cycle internal combustion engine (10) is provided which has a one-piece cylinder housing (14) removably secured to a valve drive housing (12) at a top section thereof and a crank housing (16) at a bottom section. The overall combination of the valve drive housing (12), the cylinder housing (14) and the crank housing (16) are formed in a substantially symmetrical manner about a vertical axis line (18). An intake valve member (30) is positioned in a top section of cylinder housing (14) with an exhaust port (62) located at the bottom of a piston (44) travel within a combustion chamber (54). The valve member (30) opens on a downward stroke of the piston (44) which feeds compressed air into chamber (54) and forces spent gases through the exhaust port (62).

17 Claims, 4 Drawing Sheets

TWO CYCLE ENGINE

BACKGROUND OF THE INVENTION

FIELD OF THE INVENTION

This invention relates to a two stroke cycle engine. In particular, this invention relates to a two stroke cycle internal combustion engine. Still further, this invention directs itself to a two stroke cycle engine which includes a unitarily formed cylinder housing releasably secured to a unitarily formed valve drive housing. Still further, this invention relates to an overall two cycle engine where the main components include a valve drive housing, a cylinder housing and a crank housing which are substantially symmetrical about a vertically directed axis. More in particular, this invention pertains to a two stroke cycle engine where a valve drive housing is threadedly coupled to a unitarily formed cylinder housing. Still further, this invention pertains to a two cycle engine which is modularly constructed for ease of construction and removal of the contained elements making up the engine components. Further, this invention pertains to a two cycle engine where the intake valve is controlled by an electromagnetic system including an electromagnetic device acting in magnetic cooperation with a permanent magnet attached to the stem of the intake valve. Further, this invention directs itself to a two cycle engine where a fluid jacket may be threadedly secured to a cylinder housing for ease of construction. More in particular, this invention relates to a two cycle engine whereby the cooperation of a valve drive housing in threaded securement to a cylinder housing forms a symmetrical air plenum for insertion of air into the combustion chamber of the two cycle engine. Further, this invention relates to a two cycle engine whereby a fluid jacket in threaded cooperation with the cylinder housing forms a coolant chamber at least partially surrounding the cylinder housing. This invention further pertains to an internal combustion engine which is easily adapted to a diesel engine application using a glow plug in place of a spark plug. Further, this invention relates to an engine system which through a modular design permits greater electronic manipulation to allow wide ranges of parameter changes associated with fuel intake, firing times, valve open/close duration times allowing varied power and torque combinations.

PRIOR ART

Two cycle internal combustion engines are known in the art. Two-stroke cycle engines commonly called two cycle engines require two piston strokes or only one revolution for each cycle. However, such prior two cycle engines generally had a lower piston speed and increased fuel efficiency over four stroke cycles with less of a variation in the speed and load than that found in four stroke cycle engines. The best prior art known to Applicant includes U.S. Pat. Nos. 4,445, 467; 5,111,779; 5,190,006; 5,189,996; 5,131,354; 5,163, 388; 5,154,141; 5,095,856; 5,331,929; 5,191,858; 5,159, 903; 5,133,309; 5,107,801; 4,995,354; 4,995,350; 4,995, 347; 5,515,818; and, 5,158,046.

U.S. Pat. Nos. 5,189,996 and 5,131,354 are directed to systems which are two cycle unitary block fuel injected internal combustion engines having electromagnetically operated exhaust valves in the head and an input air pump. Such are directed to generally complicated two-stroke cycle spark ignited internal combustion engines which do not provide for the symmetrical contouring as provided in the subject Application system. Such systems do not provide for modularity of construction, nor do they permit cooler valve head temperatures and results in increased costs of manufacture and operation. U.S. Pat. No. 5,111,779 is directed to an electromagnetic valve actuating system for intake/exhaust valves in an internal combustion engine. The valve actuator is mounted over the valve stem with the valve stem being formed of a magnetic material having a coil that is selectively energized to magnetize the valve stem and make it attract to a permanent magnet. In order to open the valve, the coil is de-energized and other coils are energized to generate downward magnetic lines of force. In order to close the valve, coils are de-energized and other coils are energized in combination to displace the valve. However, such systems do not direct themselves to the overall concept of a modularly formed and constructed engine system whereby parts and components are interchangeable and may be manufactured at a low cost.

None of the prior art known by Applicant provides for the subject modular design which will enable the adaptation of the same cylinder modular housing to engines of different configurations such as varying the number of cylinders and/or the displacements of particular engine systems. Such systems do not allow combinations of cylinders of different displacement as can be obtained by the subject engine system.

Additionally, such prior art two stroke engines have often encountered the problems associated with mixing of exhaust and intake gases which has resulted in lowered efficiency of such engines. The subject invention avoids the mixing of intake and exhaust gases which results in a higher engine efficiency with respect to prior art two stroke engines known by Applicant.

None of the prior art known to Applicant is provided with the unique cooling effect on the subject combination head whereby intake air is vortexed through a symmetrically positioned valve system.

SUMMARY OF THE INVENTION

This invention includes a valve drive mechanism mounted within a valve drive housing for reversibly displacing a valve member which includes both a valve head and a valve stem. A cylinder housing is releasably coupled to the valve drive housing with the cylinder housing having an upper section and a lower section forming a combustion chamber which contains a reversibly displaceable piston member. The cylinder housing has an upper section which has at least two air intake ports, a fuel injection port, and an ignition mechanism such as a spark plug or glow plug for igniting a fuel and air mixture. The cylinder housing lower section has an exhaust port for egress of exhaust gases. The valve drive housing and the cylinder housing are vertically aligned and secured each to the other. A crank housing is coupled to the cylinder housing lower section for containing a crank coupled to the piston and includes an oil pan.

An object of the subject invention system is to provide a lightweight engine which is compact in size and is particularly adaptable for insert into a smaller volume vehicle. Another object of this invention is to provide a two cycle engine which includes a simple design which is generally symmetrical in construction and has a low cost of manufacture.

A further object of this invention is to provide a two cycle engine which is modular in nature and can be easily assembled, repaired and replaced with interchanging components between differing engine systems.

It is a still further object of this invention to provide a low weight two cycle engine which is compact in size and may be located between axles of the front and/or rear wheels of a vehicle whereby the system may power each axle independently without employing a drive shaft. It is a further object of this invention to provide a two cycle engine which maximizes the friction efficiency and lowers the friction loading since it uses an electromagnetic drive mechanism and there are no cams needed to overcome any spring tension.

A further object of this invention is to provide a two cycle engine which increases engine life by lowering the cylinder head temperature during the operational cycle of the two cycle engine.

Still further, this invention has as an object to lower overall fuel consumption based upon the simplicity and modularity of design resulting from the one-piece cylinder/cylinder head construction with no head gasket expenses necessary and the associated mechanical problems.

Another object of this invention is to provide a two cycle engine which is substantially symmetrical in construction and allows a vortex displacement for intake/exhaust gases to aid in the intake/exhaust portions of the cycle.

Another object of this invention is to provide a two cycle engine which is easily adapted to prior art four cycle crank assemblies, thus having a minimal transmission change with respect to current four cycle crank assemblies.

DESCRIPTION OF THE PREFERRED EMBODIMENTS

Figure 1:
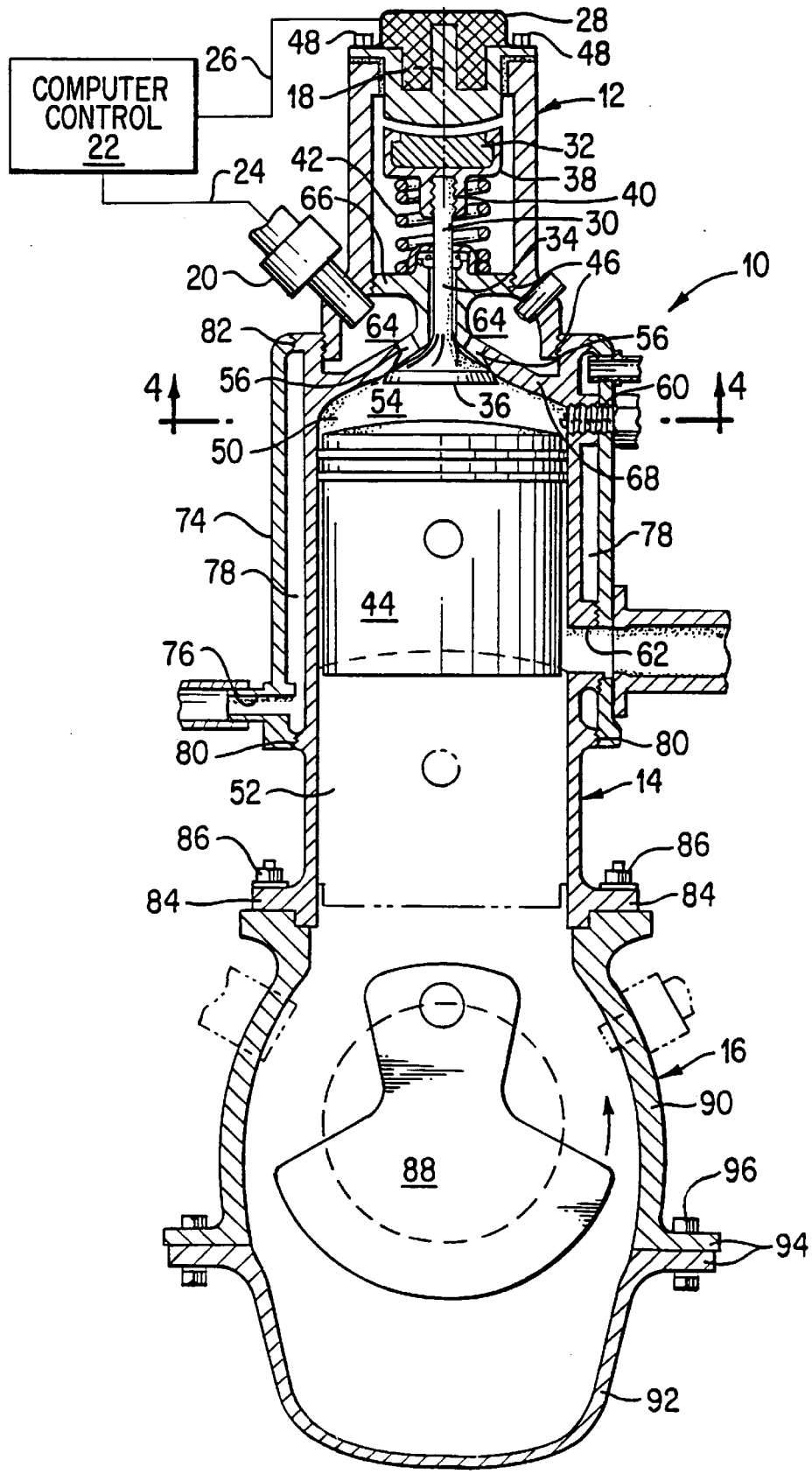
FIG. 1 is a cross-sectional elevational view partially in cut-away of the two cycle engine of this invention concept.

Referring now to FIGS. 1–5, there is shown two-stroke cycle internal combustion engines 10 which include valve drive housing 12, cylinder housing 14, and crank housing 16. As will be discussed in following paragraphs, the combination of the valve drive housing 12, cylinder housing 14, and crank housing 16 are constructed in a symmetrical manner about vertical axis line 18 which minimizes construction costs, simplifies overall design, and provides an economical modularly constructed two-cycle engine 10 which may be easily replaced with interchanging parts providing a low cost engine system.

In the manner to be described, two stroke engine 10 may be formed of cylinder housing 14 which may either be molded or machined in one-piece formation to be correspondingly fitted or otherwise coupled to crank housing 16 and valve drive housing 12 in a construction mode which essentially provides modularity between the cooperating elements for ease of replacement.

Four stroke cycle engines are well-known in the art where four strokes of the piston are necessary to complete the overall cycle. The general sequence for the four stroke cycle engine is the well-known suction stroke, followed by the compression stroke and the ignition of fuel in the cylinder which is then followed by an expansion stroke known as a power stroke, and finally the exhaust stroke. In the four stroke cycle engine, there is one power stroke for every two revolutions whereas in the two stroke cycle, there is one power stroke for one revolution. Obviously, as compared with a four-cycle engine, the two stroke cycle engine provides for greater power output per unit piston displacement for the same speed of operation. In general, four stroke engines have been used to a greater extent than two cycle engines due to the higher power ratio and cleaner combustion provided, however, with the low weight, modular design as is herein to be described, a plurality of two stroke cycle engines 10 in combination with computer control systems well-known in the art, can be utilized to provide enhanced power having the capability to surpass the power of a four-cycle engine, as well as providing a clean combustion.

Overall operation timing of two stroke engine 12 is accomplished by computer control 22, well-known in the art and not forming part of the inventive concept as herein described. Computer control 22 may be coupled as seen in FIGS. 1 and 2 through interface lines 24 and 26 to intake air inlet 20 and electromagnetic drive system 28 for reversal of polarity of electromagnetic drive 28 responsive to a particular timing sequence to be used.

Figure 2:
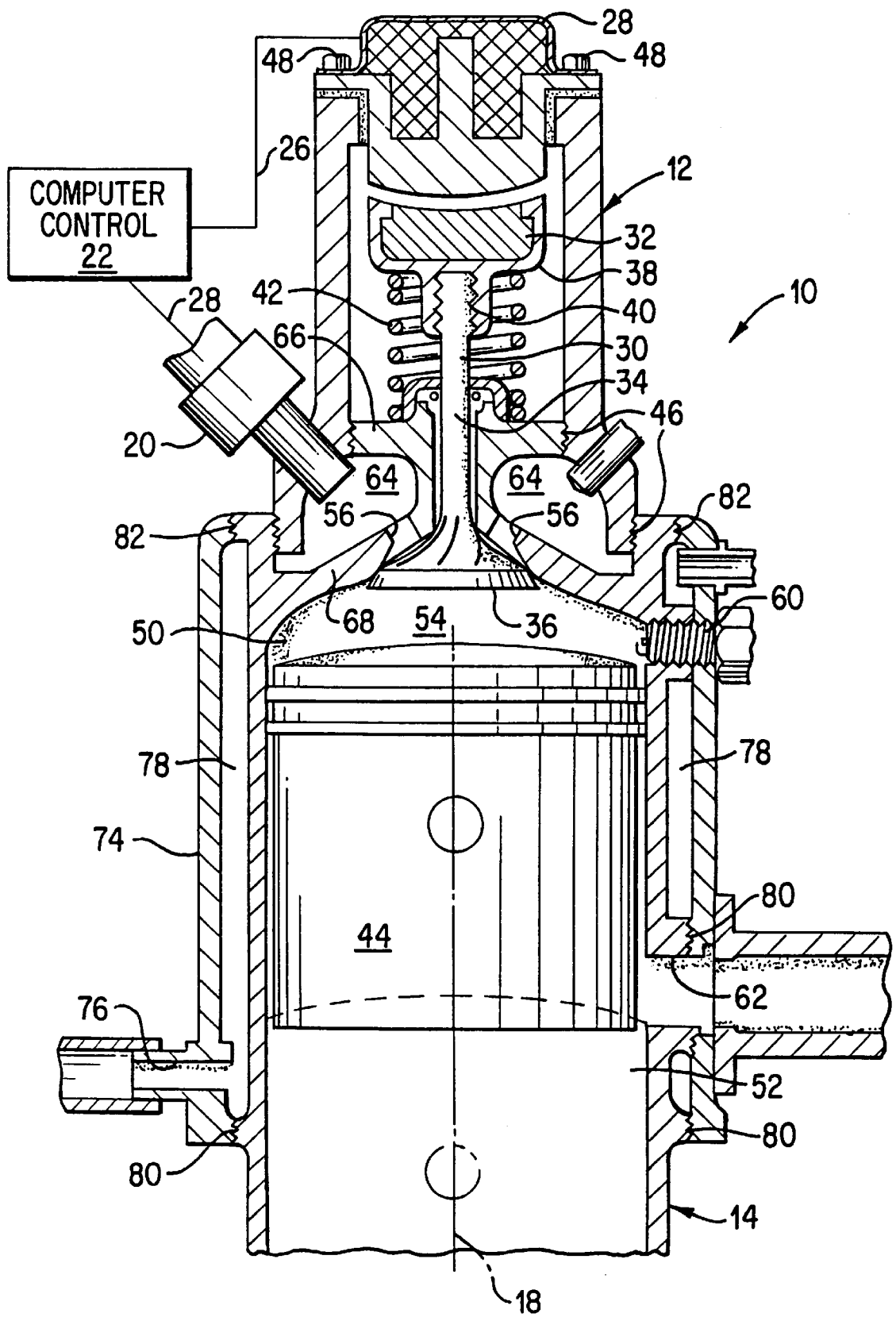
FIG. 2 is a cross-sectional view of an upper portion partially in cut-away of the two cycle engine of the subject invention concept.

Electromagnetic drive system or valve drive mechanism 28 is mounted within valve drive housing 12, as is seen in FIGS. 1 and 2, and reversibly displaces valve member 30. The valve drive mechanism includes electromagnet 28 operating responsive to control signals from computer control 22 for reversal of polarity for magnetic cooperation with permanent magnet 32 mounted at an upper end of valve member 30. Valve member 30 includes both valve stem 34 and valve head 36 generally formed in one-piece formation and formed of a substantially non-magnetic material which may be a metal composition such as aluminum, a ceramic composition, or some like composition, not important to the inventive concept as herein described, with the exception that valve member 30 has the capability of operating under the relatively high temperatures and force loading imparted thereon.

Permanent magnet 32 may be mounted in a cup housing 38 secured to an upper end of valve stem 34. Securement may be accomplished by cup threaded ferrule 40 in cooperation with a threaded upper end of valve stem 34. In this manner, permanent magnet 32 and the enclosing cup housing 38 may be easily removed from valve member 30 during a replacement process while maintaining rigid coupling during operation.

As seen in FIGS. 1 and 2, spring 42 may be mounted between a lower base surface of cup housing 38 and an upper wall member of cylinder housing 14 in order to provide a safety factor and prevent piston 44 from hitting or otherwise contacting valve head 36 in the event of a magnetic drive failure. Spring 42 may be of minimum biasing strength and biases the valve in a closed position with relation to air inlet through intake air inlet member 20.

Valve drive housing 12 is secured to cylinder housing 14 by valve drive housing and cylinder housing threaded members 46 to provide rigid securement between valve drive housing 12 and cylinder housing 14 while simultaneously allowing simple removal therefrom. Additionally, valve drive housing 12 and the internally contained elements define a symmetrical construction and set of members about vertical axis line 18 which in cooperation with further elements to be described in following paragraphs allows for easy access and simplified manufacturing components. Electromagnetic drive 28 may be mounted to valve drive housing 12 through drive bolts 48, as is shown in FIGS. 1 and 2.

Figure 4:
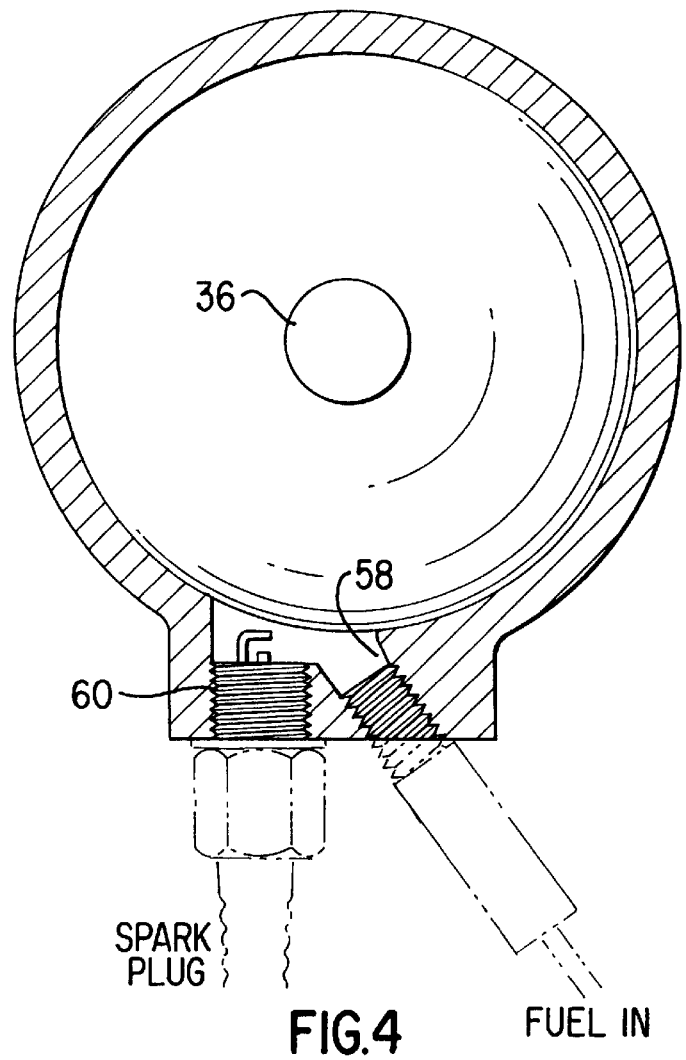
FIG. 4 is a cross-sectional view of the two cycle engine of the current invention taken along the Section Line 4—4 of FIG. 1; and, FIG. 5 is a perspective view of a valve member.

Cylinder housing 14 includes upper section 50 and lower section 52 forming combustion chamber 54 containing reversibly displaceable piston member 44. Cylinder housing upper section 50 includes at least two air intake ports 56 which are located symmetrically about vertical axis line 18, as is seen in FIGS. 1 and 2. Cylinder housing upper section 50 further includes ignition mechanism 60 which may be in the form of a spark plug type ignition or like mechanism, not important to the inventive concept with the exception that sufficient spark is provided to allow combustion of a fuel/air mixture contained within combustion chamber 54 during operation of two stroke engine system 10. Additionally, fuel injection port 58, seen in FIG. 4 is provided adjacent ignition mechanism 60 formed through a sidewall of cylinder housing 14. As is shown, ignition mechanism 60 and fuel injection port 58 are located adjacent each to the other within a sidewall of cylinder housing 14 and are substantially co-planar with respect to a horizontal plane when taken with respect to vertical axis line 18.

Cylinder housing lower section 52 includes exhaust port 62 through which the combusted air/fuel mixture may be removed from engine 10. The removal and egress of the combusted gases is aided to a substantial degree by the unique construction of valve member 30 to be described in following paragraphs. In this manner, combustion of the fuel/air mixture is provided in combustion chamber 54 and on the down stroke of piston 44, the combusted air/fuel mixture egresses from engine 10 in a highly efficient manner.

Referring further to FIGS. 1 and 2, there is shown air intake plenum 64 surrounding valve stem 34 in a symmetrical manner and in fluid communication with air inlet ports 56 as well as intake air inlet 20 as previously described. As shown, air inlet conduit 20 passes through a wall of valve drive housing 12 for charging of plenum chamber 64. Plenum chamber 64 is formed by cylinder housing flange 66 and cylinder housing upper wall 68 acting in coupled cooperation to form plenum chamber 64. Thus, as can be seen, by threadedly securing valve drive housing 12 to cylinder housing 14 at threaded sections 46, an enclosed symmetrically formed plenum chamber 64 is formed for charging of combustion chamber 54 at appropriate points in the overall operational engine cycle. In this manner, when valve member 30 is in a closed position, air under control by computer control 22 passes through intake air inlet 20 to charge plenum chamber 64. Upon opening of valve member 30, air is then inserted or charged into cylinder housing upper section 50.

Figure 5:
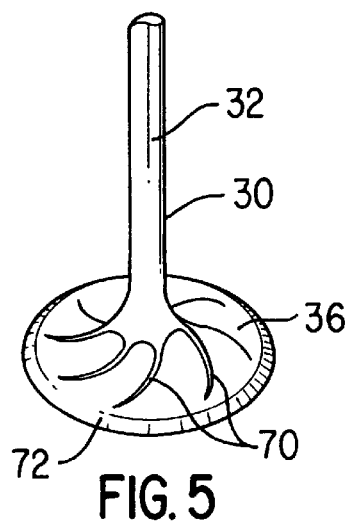

Referring now to FIG. 5, the construction of valve member 30 includes a plurality of vane members 70 formed on an upper surface of valve head 36 to provide vortexing of air being inserted into combustion chamber 54 through inlet ports 56. Valve member 30 and associated valve head 36 include valve seat 72 for contact closure with air inlet ports 56 in the standard manner. The vortexing of the air entering combustion chamber 54 aids in the exhaust phase of the spent gas since such provides a turbulence vortex which increases the efficiency in removal of the spent gases through exhaust port 62 while simultaneously mixing the substantially pure air mixture within combustion chamber 54. Advantage to the combustion process is also derived from the substantially constant temperature throughout the combustion chamber wherein thermal degradation stresses are reduced over that previously found for two cycle engines.

Referring further to FIGS. 1 and 2, two stroke engine 10 may further include fluid cooling jacket 74 coupled to and surrounding at least a portion of cylinder housing 14. Fluid cooling jacket 74 may be a fluid cooling jacket for water charging through coolant port 76 coupled on an opposing end to the radiator of the vehicle or alternatively jacket chamber 78 may be adapted for simple air cooling. As can be seen more clearly in FIG. 2, cooperation of the jacket lower thread members 80 with threaded members of cylinder housing 14 and further cooperation of jacket upper threaded members 82 in cooperation with upper threaded members of cylinder housing 14 provides for fluid cooling chamber 78. In this manner, fluid cooling jacket 74 may easily be removed from cylinder housing 14 and provides an overall modular system which is easily replaced, removed, or constructed at the discretion of the user.

Cylinder housing lower section 52 includes cylinder housing lower flanges 84 which are coupled to crank housing 16 by bolts 86.

Crank housing 16 includes a standard crank 88 contained therein which is coupled to piston 44 in the normal manner of operation of an internal combustion engine. Crank housing 16 is formed of a crank housing upper section 90 and a crank housing lower section 92 essentially forming an oil pan which are coupled through mating flanges 94 by bolts 96.

In this manner, a totally modular two stroke cycle engine 10 may be constructed by simply threadedly securing valve drive housing 12 to cylinder housing 14 by threaded engagement as provided by elements 46. Fluid cooling jacket 74 may be similarly threadedly engaged at threaded elements 80 and 82 to one piece cylinder housing 14 resulting in respectively plenum chamber 64 and fluid cooling jacket 78 being created. Finally, crank housing 16 through threaded securement of bolts 86 may be joined to cylinder housing 14 to provide an overall enclosed combustion system.

Figure 3:
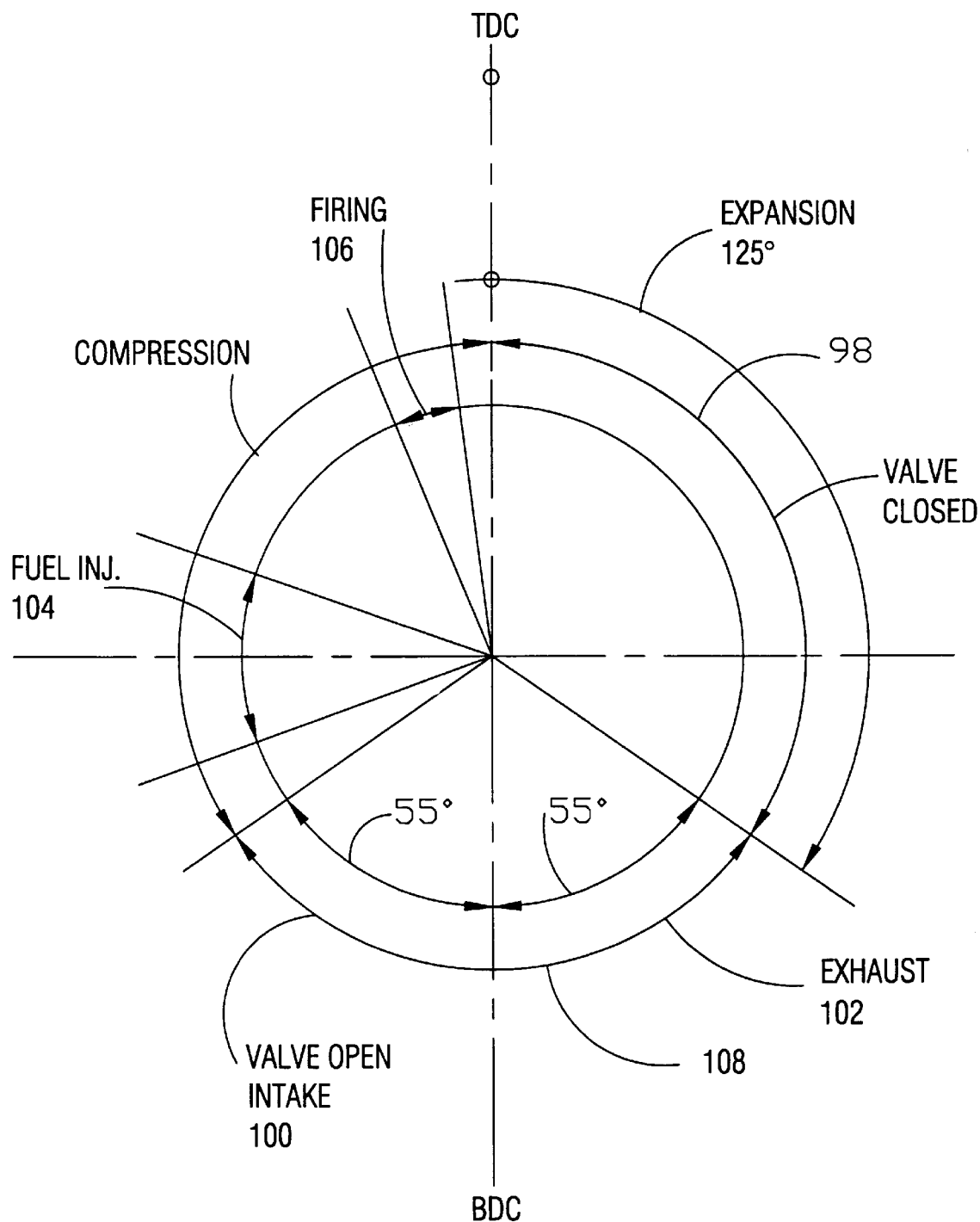
FIG. 3 is a typical timing diagram used for the subject invention system.

A typical timing type diagram is shown in FIG. 3 where one revolution of 360° corresponds to a motion of piston 44 from a top dead center (TDC) to a bottom dead center (BDC) and a return to top dead center. The actual timing of valve member 30 from open to closed and closed to open position is under control of computer control 22 and may be changed for maximization of efficiency of engine 10. Typically, directional arrow 98 shows valve member 30 being closed at top dead center and such remains closed for approximately 125° of the cycle. Valve member 30 is then opened and is maintained in a an open position as shown by directional arrow 100 until piston 44 reaches the top of the exhaust port and is then closed again for compression. The valve remains closed until it reaches the top of the exhaust port. Exhaust as shown by directional arrow 102 extends through an approximate 55° range on either side of the BDC and overlaps with air intake as shown by directional arrow 108 which extends for approximately 110° of the entire cycle. Both fuel injection and firing shown by directional arrows 104 and 106 respectively occur near the top dead center position of piston 44 and are sequentially actuated through approximately the remaining 40° and 20°, respectively, of the overall cycle.

Although this invention has been described in connection with specific forms and embodiment thereof, it will be appreciated that various modifications other than those discussed above may be resorted to without departing from the spirit or scope of the invention. For example, functionally equivalent element may be substituted for those specifically shown and described, proportional quantities of the elements shown and described may be varied, and in the formation method steps described, particular steps may be reversed or interposed, all without departing from the spirit or scope of the invention as defined in the appended claims.

What is claimed is:

1. A two cycle engine comprising:
   (a) valve drive means mounted within a valve drive housing for reversibly displacing a valve member having a head and a stem;
   (b) a cylinder housing housing an upper section and a lower section forming a combustion chamber containing a reversibly displaceable piston member, said cylinder housing upper section having (1) at least two air intake ports, (2) a fuel injection port, and (3) ignition means for igniting a fuel and air mixture, said cylinder housing lower section having an exhaust port for egress of exhaust gases, said valve drive housing and said cylinder housing being vertically aligned and secured each to the other,
   (c) a crank housing coupled to said cylinder housing lower section for containing a crank coupled to said piston, and an oil pan; and,
   (d) an air intake plenum surrounding said valve stem and in fluid communication with said air inlet ports for passage of air therebetween, said valve drive housing having an air inlet conduit passing through a wall thereof for fluid communication with said air intake plenum.

2. The two cycle engine as recited in claim 1 including a fluid cooling jacket housing coupled to and surrounding at least a portion of said cylinder housing.

3. The two cycle engine as recited in claim 2 where said fluid cooling jacket housing is threadedly secured to said cylinder housing.

4. The two cycle engine as recited in claim 1 where said cylinder housing is formed in one-piece formation.

5. The two cycle engine as recited in claim 1 where said intake ports are located symmetrically about a vertical axis of said cylinder housing.

6. The two cycle engine as recited in claim 1 where said valve stem is vertically displaceable within a valve guide passageway forming an upper end of said cylinder housing.

7. The two cycle engine as recited in claim 1 where said valve head member includes an upper surface having a plurality of arcuately directed vane elements formed thereon for creating a vortex of air flow entering said combination chamber through said air intake ports.

8. The two cycle engine as recited in claim 1 where said ignition means and said fuel injection port are located in substantially a horizontally co-planar manner adjacent each to the other.

9. The two cycle engine as recited in claim 1 where said valve drive means includes:
   (a) a permanent magnet mounted at an upper end of said valve stem; and,
   (b) electromagnetic drive means in vertical alignment with said permanent magnet for actuating said reversible displacement of said valve member.

10. The two cycle engine as recited in claim 9 where said permanent magnet is located within a cup member secured to said valve stem.

11. The two cycle engine as recited in claim 10 where said cup member is threadedly secured to said valve stem.

12. The two cycle engine as recited in claim 10 including spring biasing means located between said cup member and an upper flange of said cylinder housing to bias said valve member in a closed position.

13. The two cycle engine as recited in claim 1 where said valve member is formed of a substantially non-magnetic composition material.

14. The two cycle engine as recited in claim 1 where said cylinder housing and said valve drive housing are threadedly secured each to the other.

15. The two cycle engine as recited in claim 1 where said valve drive housing is symmetrically formed about a vertical axis of said combustion chamber.

16. The two cycle engine as recited in claim 1 where said cylinder housing includes a lower flange and said crankshaft housing includes an upper flange mounted in mating relation each to the other.

17. The two cycle engine as recited in claim 16 where said crankshaft upper flange is bolted to said cylinder housing lower flange.

* * * * *